United States Patent
Goodman

(10) Patent No.: US 8,991,755 B2
(45) Date of Patent: Mar. 31, 2015

(54) SWING DOWN MOUNT FOR HELICOPTER AND METHOD FOR OPERATING SAME

(71) Applicant: SpaceCam Systems, Inc., Westlake Village, CA (US)

(72) Inventor: Ronald C. Goodman, Westlake Village, CA (US)

(73) Assignee: SpaceCam Systems, Inc., Westlake Village, CA (US)

( * ) Notice: Subject to any disclaimer, the term of this patent is extended or adjusted under 35 U.S.C. 154(b) by 0 days.

(21) Appl. No.: 14/058,045

(22) Filed: Oct. 18, 2013

(65) Prior Publication Data

US 2014/0263834 A1 Sep. 18, 2014

Related U.S. Application Data

(60) Provisional application No. 61/800,058, filed on Mar. 15, 2013.

(51) Int. Cl.
| | |
|---|---|
| *B64C 1/20* | (2006.01) |
| *G03B 15/00* | (2006.01) |
| *B64D 47/08* | (2006.01) |
| *B64D 9/00* | (2006.01) |
| *B64C 27/04* | (2006.01) |

(52) U.S. Cl.
CPC *B64D 47/08* (2013.01); *B64D 9/00* (2013.01); *B64C 27/04* (2013.01)
USPC .......................................... 244/118.1; 396/12

(58) Field of Classification Search
USPC .......................................... 396/12; 244/118.1
See application file for complete search history.

(56) References Cited

U.S. PATENT DOCUMENTS

| | | | | |
|---|---|---|---|---|
| 4,162,776 | A | * | 7/1979 | Sibley et al. ............... 244/118.1 |
| 4,247,067 | A | * | 1/1981 | Smith ...................... 248/123.11 |
| 4,989,466 | A | * | 2/1991 | Goodman ...................... 74/5.22 |
| 5,365,291 | A | * | 11/1994 | Maeda ............................ 396/12 |
| 5,710,945 | A | | 1/1998 | Thompson |
| 7,274,868 | B2 | * | 9/2007 | Segal et al. ..................... 396/12 |

FOREIGN PATENT DOCUMENTS

| | | |
|---|---|---|
| JP | H06166399 | 6/1994 |
| JP | H09127626 | 5/1997 |
| WO | 2010058195 A1 | 5/2010 |

* cited by examiner

*Primary Examiner* — Clayton E Laballe
*Assistant Examiner* — Linda B Smith
(74) *Attorney, Agent, or Firm* — Sheppard, Mullin, Richter & Hampton LLP

(57) ABSTRACT

A swing down mount system for mounting a camera gimbal or other viewing/recording device to a helicopter is disclosed. The system comprises a frame, an axle mounted on the frame, an arm attached to the axle, a camera gimbal or other device mounted on the arm, and one or more counterweights. During landing and takeoff, the system is positioned substantially horizontally below the fuselage of the helicopter so that the helicopter can touch down on the ground without interference from the system. In the air, the mount is able to position the camera gimbal below the skids or wheels of the helicopter so that the camera gimbal has a 360-degree field of view that is unobstructed by the structure of the helicopter. When the camera gimbal is moved from one position to another, the counterweights swing in opposition such that the lateral center of gravity remains substantially unchanged or within acceptable limits.

20 Claims, 4 Drawing Sheets

SWING DOWN MOUNT FOR HELICOPTER AND METHOD FOR OPERATING SAME

CROSS-REFERENCE TO RELATED APPLICATION

The present application claims priority to U.S. Provisional Application No. 61/800,058, entitled "Swing Down Mount for Helicopter and Method for Operating Same," filed Mar. 15, 2013, the entire contents of which are herein incorporated by reference.

BACKGROUND OF THE INVENTION

The present invention relates generally to systems, methods, and apparatus for mounting accessories on helicopters, and, more particularly, for mounting cameras, gimbals, scanners and other imaging devices on helicopters.

Conventional methodology for the mounting of cameras, gimbals, scanners and various types of imaging devices on helicopters has involved fixed bracketry attached to airframe hardpoints capable of providing sufficient structural strength to bear the loads involved in aircraft maneuvering and rough landing forces. These systems generally position the installed devices (e.g., camera or gimbal) in fixed positions either on the nose, chin, side, or tail of the aircraft. However, these configurations are limited in that these fixed positions do not allow an unhindered, 360 degree field of view for the installed device. This is due to the fact that the landing skids or wheels of the helicopter must extend below the level of the camera, gimbal, or other device so that the aircraft may land safely. As such, the installed device's view is hindered by the structure of the helicopter.

Additionally, these fixed camera mounts can cause an imbalance in the weight of the aircraft due to the fact that a heavy camera gimbal or device is installed on only one side of the aircraft. As such, these conventional helicopter camera configurations often require crabbing of the aircraft to account for the weight imbalance.

Thus, it can readily be appreciated that there is a need for a helicopter mount that allows for a camera, gimbal, or other such device to be installed and positioned such that the structure of the helicopter does not obstruct the view of the device. It can also be appreciated that there is a further need for a helicopter mount that minimizes weight imbalance on an aircraft with a camera gimbal or other imaging device installed. The present invention fulfills these needs and provides further related advantages.

SUMMARY OF THE INVENTION

The present invention resides in a mounting system for mounting an imaging device to a helicopter to capture aerial images. In one embodiment, the system may comprise a frame, an axle mounted to the frame, an arm attached to the axle, an imaging device mounted on the arm, a counterweight, and a motor configured to control rotation of the axle. The system is configured to be mounted to a helicopter for the capture of aerial images. The frame is configured to be mounted to a helicopter. The counterweight is configured such that re-positioning of the imaging device will result in a corresponding re-positioning of the counterweight. In certain embodiments, the imaging device may be a camera gimbal.

The mounting system may further comprise a second arm mounted on the axle, and the counterweight may be positioned on the second arm. In a more particular embodiment, the counterweight may be built into the end of the second arm.

In an alternative embodiment, the mounting system may comprise a second axle mounted on the frame, and a second arm mounted on the second axle, wherein the counterweight is positioned on the second arm.

The mounting system may further comprise a processor for controlling the rotation of the motor, and, thereby, the positioning of the imaging device. The mounting system may also include one or more sensors that provide information to the processor. The processor can automatically adjust the position of the imaging device based on information from the one or more sensors. The sensors might provide pitch and roll information to the processor.

The mounting system might also include a selective damping mechanism, such as a magnetic brake, for locking the imaging device in a given position.

The imaging device and the counterweight may be of such weight and positioned such that the center of gravity of the mounting system remains within an acceptable range when the position of the imaging device is changed.

The disclosure is also embodied in a method for operating an image device mount, such as the mounting system described above. The method comprises mounting the imaging device mount onto a helicopter; positioning the imaging device mount in a stowed position, the stowed position being a position in which no portion of the imaging device is positioned below the lowest point of the helicopter; taking off in the helicopter with the imaging device mount in the stowed position; and re-positioning the imaging device mount into a deployed position that is different from the stowed position. The deployed position may be a position in which at least a portion of the imaging device is positioned below the lowest point of the helicopter.

The method might further comprise the step of locking the imaging device into a deployed position using a selective damping mechanism. As discussed above, the imaging device mount might include a processor for controlling the motor and one or more sensors in communication with the processor to provide information to the processor. In this embodiment, the method might also comprise the step of automatically re-positioning the imaging device based on information from the one or more sensors. The information might comprise rate and pitch information.

Other features and advantages of the invention should become apparent from the following description of the preferred embodiments, taken in conjunction with the accompanying drawings, which illustrate, by way of example, the principles of the invention.

BRIEF DESCRIPTION OF THE DRAWINGS

Presently preferred embodiments of the invention will now be described, by way of example only, with reference to the following drawings.

DETAILED DESCRIPTION OF THE PREFERRED EMBODIMENTS

Figure 1:
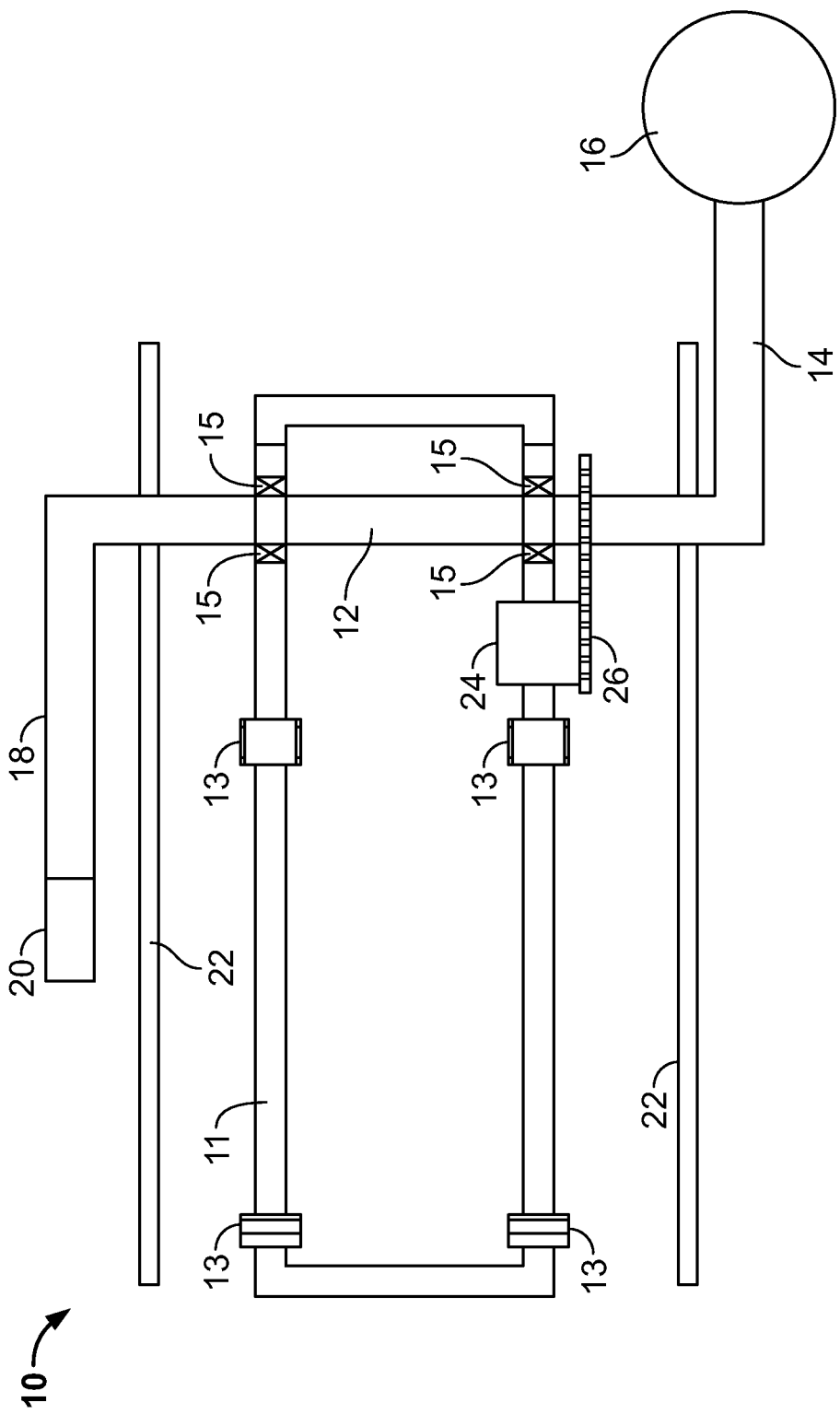
FIG. 1 is a top-down view of a single axle swing down mount, in accordance with an embodiment of the present disclosure.
Figure 2:
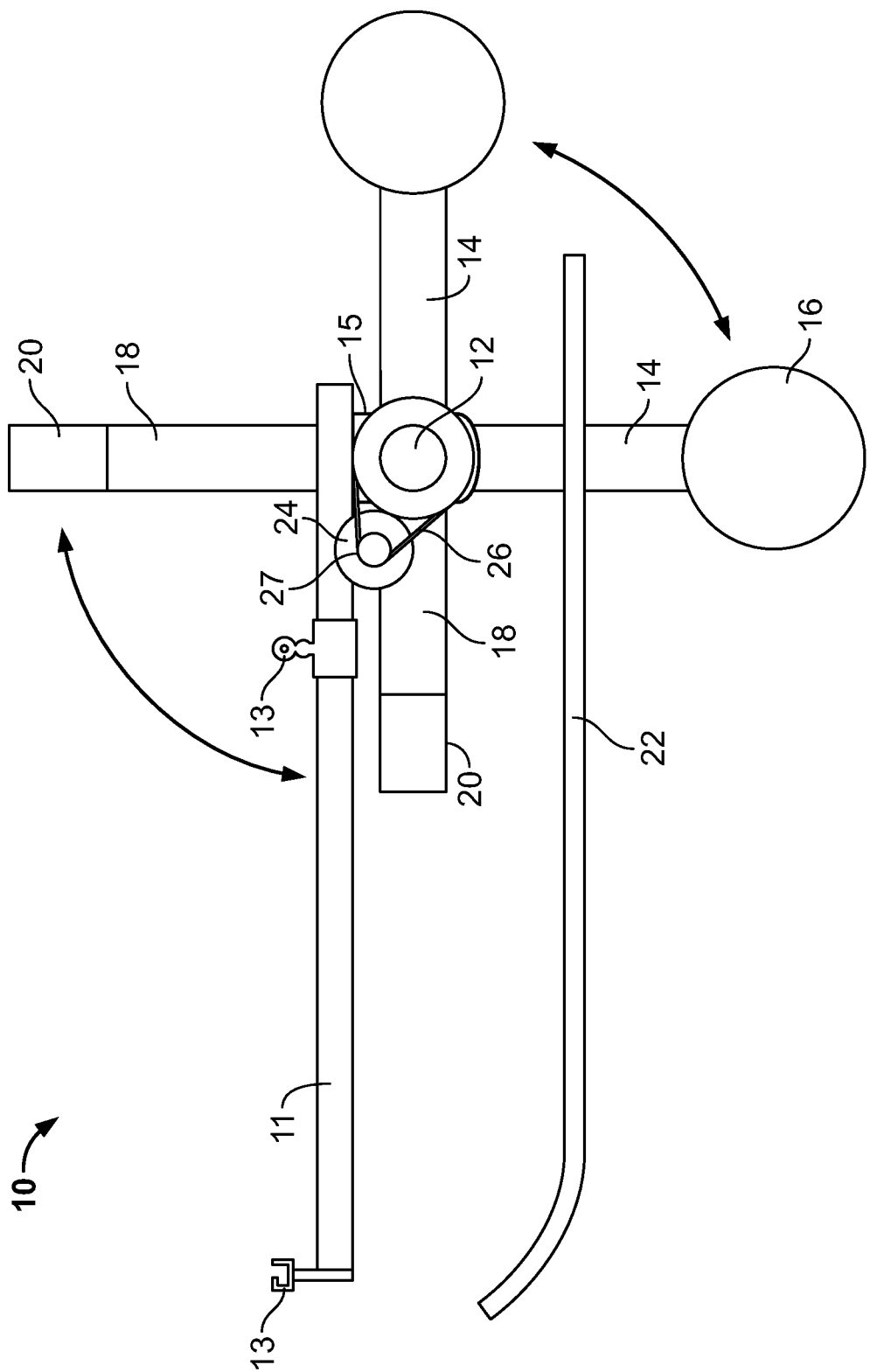
FIG. 2 is a side view of the single axle swing down mount of FIG. 1.
Figure 3:
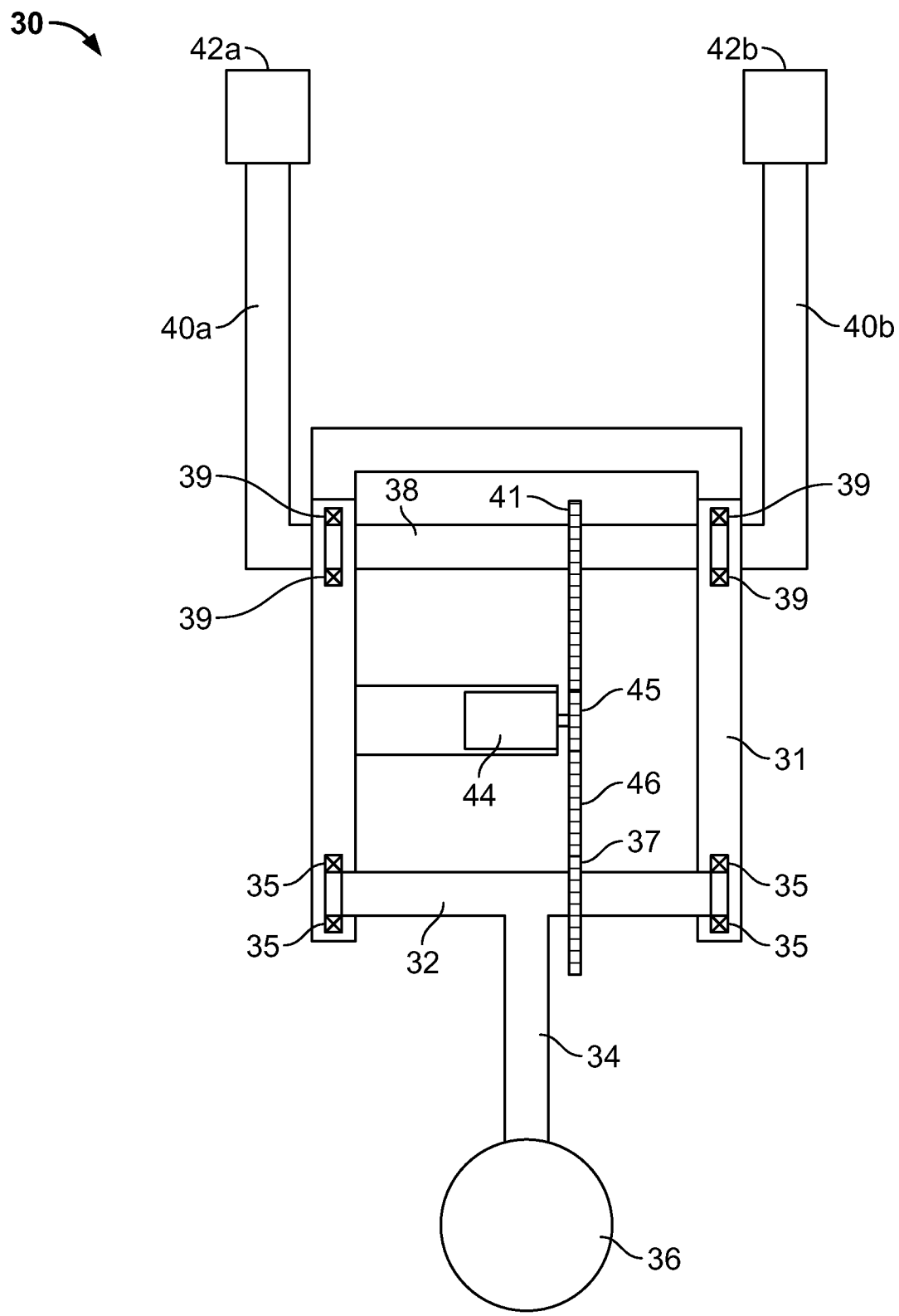
FIG. 3 is a top-down view of a double axle swing down mount, in accordance with one embodiment of the present disclosure.
Figure 4:
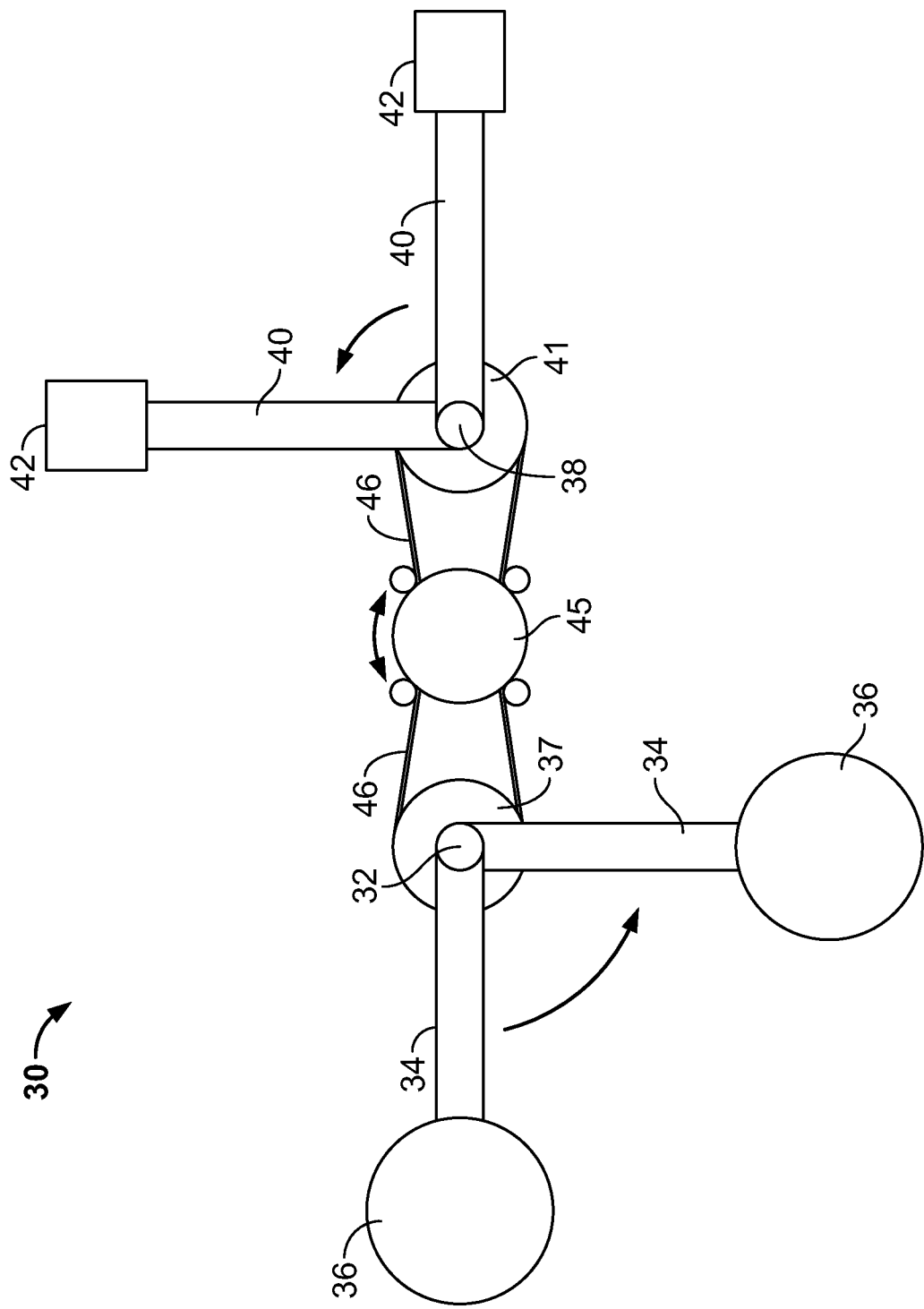
FIG. 4 is a side view of the double axle swing down mount of FIG. 3.

Referring now to the drawings, FIGS. 1 and 2 depict a single axle configuration of a swing down mount system in accordance with an embodiment of the present invention, and FIGS. 3 and 4 depict a double axle configuration in accordance with another embodiment of the present invention. A common principle of the two configurations is the use of one or more rotating axle tube assemblies with arms attached to the ends of the axle tube assemblies that move in opposing directions. These mounts may be used to mount a camera gimbal or other image recording assembly to a helicopter for aerial images. Some commonly used helicopter models for aerial images include the Eurocopter AS350 Ecureuil/Astar helicopter and the Eurocopter AS355 TwinStar helicopter.

FIG. 1 provides a top-down view of one embodiment of a swing down mount 10 for use with an aircraft. This embodiment comprises a frame 11 and a single axle 12 that is mounted on the frame. On one end of the axle 12, there is attached a first arm 14 with a camera gimbal 16 installed. Although the figures use a camera gimbal 16 as the installed device, it may be any other camera, scanner, or device installed on the outside of an aircraft. At the opposite end of the axle 12 is a second arm 18 extending in the opposite direction of the first arm 14. The second arm 18 mounts a ballast or counterweight 20 that is similar or substantially identical to the mass of the camera gimbal 16 on the opposite side. By providing this counterweight 20 to balance out the gimbal 16, the lateral center of gravity remains substantially unchanged or within the limits of an aircraft. In one embodiment, the tubing used for the axle 12 and the arms 14, 18 is made of carbon fiber and has a diameter of approximately 8 inches. The elbows connecting the axle 12 with the arms 14, 18 may be reinforced with 4730 steel oversleeves or the like. The counterweight 20 may be contained within the tubing of the second arm 18. Preferably, the weight is concentrated near the end of the arm 18 so as to effectively balance the weight of the camera gimbal 16, which is located at the end of the first arm 14.

The swing down mount 10 is configured to be mounted on an aircraft to capture aerial images. The frame 11 of the mount 10 can be mounted onto a helicopter such that the axle 12 extends across the longitudinal axis of the helicopter fuselage. Mounting of the frame 11 to the helicopter may be carried out in a multitude of ways. In the depicted embodiment, four struts 13 are built into or attached to the frame 11. These struts 13 are positioned such that they align with hardpoints on the helicopter. For example, on the Eurocopter A350 and A355 helicopters, four hardpoints are built into the cross-tubes of the aircraft with half-clamps positioned at each hardpoint. The struts 13 may be positioned on the frame 11 so as to line up with these half-clamps and sized to fit into and bolted to the half-clamps.

FIG. 1 depicts the swing down mount 10 in a stowed configuration for take-off and landing with its arms 14, 18 substantially horizontal to the ground. In this configuration, the arms 14, 18, and the camera gimbal 16, are positioned above the skids 22 of the helicopter so that the helicopter can safely touch down on the ground without interference from the mount 10. In the displayed configuration, the camera gimbal 16 extends toward the rear of the helicopter while the counterweight 20 extends forward, but this may be reversed, so that the camera gimbal 16 extends forward for take off and landing, and the counterweight 20 extends backward.

Upon take-off, the camera gimbal 16 may be deployed below the level of the helicopter skids 22 by rotating the axle 12 approximately 90-degrees, thereby moving the device to a position below the aircraft structure and allowing for the gimbal 16 to have a clear, unobstructed 360-degree view. FIG. 2 provides a side view of the swing down mount 10 to more clearly demonstrate this movement. The axle 12 may be surrounded by a thin-ring sealed ball bearing 15 to facilitate smooth rotation of the axle 12. The length of the arm 14 will depend upon the specific airframe, the size and weight of the gimbal 16, and the desired vertical field of view.

When the camera gimbal 16 is rotated downward, the second arm 18 with the counterweight 20 is rotated upward, and vice versa. The load through the axle 12 is balanced so that relatively little motive force is needed to effect deployment. This motive force may be provided by a belt or chain 26 coupled to an electric motor 24 to rotate the axle 12. A large-diameter sprocket 25 is mounted on the axle 12 while a small-diameter sprocket 27 is mounted on the motor 24, with the chain 26 connecting the large-diameter and small-diameter sprockets 25, 27. The sprockets may be 1-inch sprockets. A 14-rpm motor with a 7:1 ratio could be used for the motor 24. Alternatively, pneumatic rotation or linear or any other means of motive power may be applied. Instead of a chain with sprockets, large-diameter and small-diameter spur gears may be used. For example, the drive gear of the motor might be connected to a 1 or 2 inch spur gear, while a 10-12 inch spur gear is connected to the axle 12. The motor 24 may be a single motor or multiple motors working in tandem. The motor 24 should have sufficient power to withstand the torque exerted by the system in flight. For example, if the gimbal 16 is a 30-inch sphere attached to a six-foot arm 14, a motor or combination of motors that can provide between 700 and 1000 inch-pounds of torque might be used.

In one embodiment, limit switches could define "stowed" and "deployed" end positions, although other means of positioning could also be utilized. The center of gravity for the entire mounting system 10, the device 16, and the counterweight 20 remains substantially constant on the airframe in the lateral, longitudinal, and the vertical positions, thereby providing a substantially constant aircraft control response regardless of the position of the gimbal 16 during stowage, deployment, or final deployed position.

The camera gimbal 16 may also be rotated to provide alternative camera angles and views as well, rather than simply a single 360 degree view from below the helicopter. If the axle 12 is sufficiently long for the gimbal 16 to clear the sides of the aircraft, the gimbal 16 may be rotated 360-degrees and stopped at any point along the rotation. Magnetic brakes could be used to lock the camera gimbal 16 in any rotational position. For example, from the horizontal stowed position depicted in FIGS. 1 and 2, the gimbal 16 may be rotated forward approximately 120 degrees to position the gimbal 16 at the pilot's shoulder. This allows the pilot to maneuver the helicopter with the knowledge that the camera's view is very similar to his own view. The ability to move the camera gimbal 16 in this way makes it easier for the cameraman and the pilot to work together. It also provides a creative tool to change the angle, perspective, and view of shots taken by taking advantage of the ability to move and re-position the camera gimbal 16.

The mount 10 may also include a processor, computing device, or other processing means to control the rotation of the axle 12, thereby controlling the positioning of the gimbal 16 and counterweight 20. Sensors may also be placed on the helicopter body that are in communication with the processor, computing device, or processing means. The processor may also be in communication with the gimbal 16. The sensors on the aircraft can detect the pitch and roll of the aircraft, and the processor can use those readings to automatically adjust the motor 24, and thus, the position of the gimbal 16. The processor can use the aircraft's pitch and roll readings to automatically adjust the rotation of the axle 12, the position of the gimbal 16 and the orientation of the camera within the gimbal so as to keep a steady shot or stay focused on a particular subject.

In an emergency situation, such as in the event of a power loss or motor failure, the need may arise for an alternative method to retract the camera gimbal 16 back to the stowed position. A lithium-ion battery pack may be used to provide power to the motor in the event of a power failure so as to provide a back-up source of power. Alternatively, the mount system may take advantage of the natural drag created by the gimbal 16 to move it into a horizontal position that is safe for landing. For example, a 30-inch spherical gimbal will create approximately 130 lbs. of drag at a speed of 30 knots. In the event of a power failure, the axle 12 can be free to swing such that the drag created from the forward motion of the helicopter will cause the gimbal 16 to rotate backward and above the level of the landing skids. In this configuration, second arm 18 and the counterweight 20 might be stream-lined so that they create relatively little drag compared to the gimbal 16 so that the gimbal 16 can more easily fall back into the stowed position. In a further embodiment, a spring-loaded retrieval system may be used to pull the gimbal 16 back into a horizontal position in the event of a power failure. The pilot of the helicopter may have a bicycle lever or other control mechanism to release a locking mechanism, such as an over-center lock, to release the motor drive gear from the axle gear, thereby allowing the axle to freely rotate. A bungee cord could then pull the mount 10 back into a stowed position. Initiation of this retrieval system by the pilot may also cause a detent wheel to catch and lock the axle 12 and arms 14, 18 in their stowed position.

FIGS. 3 and 4 depict an alternative double axle configuration. In FIG. 3, the depicted double axle swing-down mount 30 comprises a front axle 32 with a center mounted extension arm 34 mounted proximate the nose of the airframe. On the end of the center mounted extension arm 34, a camera gimbal 36 or other device may be mounted. A second axle 38 is mounted further back on the airframe with two arms 40a, 40b attached on either end. On the ends of the arms 40a, 40b are two counterweights 42a, 42b. Preferably, counterweights 42a, 42b are equal in mass so as to balance the mass distribution.

In the double axle swing-down mount 30, the axles 32, 38, are coupled together in such a way that when the gimbal 36 is lowered in the front of the aircraft, the counterweights 42a, 42b are raised in the rear of the aircraft so that the forces are balanced throughout the mechanism. In FIG. 3, the front axle 32 has a large sprocket 37 that is connected to a motor sprocket 45 through a belt 46. The belt 46 also connects a second sprocket 41 to the motor sprocket 45 to control rotation of the rear axle 38. Ring bearings 35, 39 facilitate smooth rotation of the front axle 32 and rear axle 38. Alternatively, coupling of the axles 32, 38 and the motor 44 may be performed by equipping both axles 32, 38 and the motor drive shaft with gears, toothed pulleys, or any other appropriate means. Additionally, axles 32, 38 may be coupled to each other to create the described off-setting movement, or any other appropriate configuration to achieve the desired movement. FIG. 4 shows the double axle swing-down mount 30 from a side view.

The double axle swing-down mount 30 may gain motive power through the same means as those described with respect to the single axle mount 10, and may be limited in excursion with appropriate position sensors and hard mechanical stops. Both systems may also employ a "fail safe" secondary means of system retrieval in the case of an electrical failure, as was discussed above with respect to FIGS. 1 and 2. This "fail safe" system may be implemented through the use of a secondary electrical back-up system, secondary motors, pneumatic mechanisms, spring-loaded retrieval systems, or any other appropriate means.

Provisions could also be made in the disclosed systems for longitudinal and lateral compliance of the deployed gimbal or device by employed selective damping to the rotation of the axles, possibly through the use of magnetic brakes. These provisions could also include introducing a lateral "joint" that could be made active once the gimbal or device has reached a pre-set deployed position. This feature could mitigate the swing of the device mounting caused by helicopter control inputs, thereby increasing gimbal or device stability and spatial positioning. Preferably, the disclosed mount systems can be broken down for easy removal from the aircraft, transport, and then re-attachment to another aircraft.

Although the invention has been disclosed with reference only to the presently preferred embodiments, those of ordinary skill in the art will appreciate that various modifications can be made without departing from the invention. Accordingly, the invention is defined only by the following claims.

What is claimed is:

1. A mounting system comprising:
a frame defining a plane;
an axle mounted on the frame, the axle having a first end and a second end;
a first arm attached to the axle at or near the first end of the axle;
a second arm attached to the axle at or near the second end of the axle;
a device mounted on the first arm;
a counterweight positioned on the second arm; and
a motor configured to rotate the axle;
wherein the frame is configured to be mounted to a helicopter;
wherein the axle is configured to rotate such that rotation of the axle re-positions the device, the re-positioning of the device including positions on both sides of the plane of the frame; and
wherein the counterweight is configured such that re-positioning of the device results in a corresponding re-positioning of the counterweight.

2. The mounting system of claim 1, wherein the device is a camera gimbal.

3. The mounting system of claim a 1, wherein the counterweight is built into the second arm.

4. The mounting system of claim 1, further comprising a computing device for controlling the position of the device.

5. The mounting system of claim 1, further comprising a selective damping mechanism for locking the device in a given position.

6. The mounting system of claim 1, wherein the counterweight and the device are positioned such that the center of gravity of the mounting system remains within an acceptable range when the position of the device is changed.

7. The mounting system of claim 1, wherein the axle is of a length sufficient to allow 360° rotation of the first and second arms.

8. The mounting system of claim 1, wherein the device is horizontally offset from the counterweight relative to a longitudinal axis defined by the frame.

9. The mounting system of claim 4, further comprising one or more sensors in communication with the computing device such that the computing device can automatically adjust the position of the device based on information from the one or more sensors.

10. The mounting system of claim 9 wherein the one or more sensors are configured to provide pitch and roll information to the computing device.

11. The mounting system of claim 5, wherein the selective damping mechanism comprises a magnetic brake.

12. A mounting system comprising:
a frame defining a plane;
an axle mounted on the frame, the axle having a first end and a second end;
a first arm attached to the axle at or near the first end of the axle;
a second arm attached to the axle at or near the second end of the axle;
a device mounted on the first arm;
a counterweight positioned on the second arm; and
a motor configured to rotate the axle;
wherein the frame is configured to be mounted to a helicopter;
wherein the axle is configured to rotate such that rotation of the axle re-positions the device, the re-positioning of the device including a helicopter side of the plane of the frame; and
wherein the counterweight is configured such that re-positioning of the device results in a corresponding re-positioning of the counterweight.

13. The mounting system of claim 12, further comprising a computing device for controlling the position of the device and one or more sensors in communication with the computing device such that the computing device can automatically adjust the position of the device based on information from the one or more sensors.

14. The mounting system of claim 12, wherein the counterweight and the device are positioned such that the center of gravity of the mounting system remains within an acceptable range when the position of the device is changed.

15. The mounting system of claim 12, wherein the axle is of a length sufficient to allow 360° rotation of the first and second arms.

16. The mounting system of claim 12, wherein the device is horizontally offset from the counterweight relative to a longitudinal axis defined by the frame.

17. A mounting system comprising:
a frame defining a plane;
a first axle mounted on the frame;
a first arm attached to the first axle;
a device mounted on the first arm;
a second axle mounted on the frame;
a second arm attached to the second axle;
a counterweight positioned on the second arm; and
a motor configured to rotate the first and second axles;
wherein the frame is configured to be mounted to a helicopter;
wherein the first axle is configured to rotate such that rotation of the first axle re-positions the device;
wherein the second axle is configured to rotate such that rotation of the second axle re-positions the counterweight;
wherein the axles and counterweight are configured such that re-positioning of the device results in a corresponding re-positioning of the counterweight, the re-positioning of the counterweight including positions on both sides of the plane of the frame.

18. The mounting system of claim 17, further comprising a computing device for controlling the position of the device and one or more sensors in communication with the computing device such that the computing device can automatically adjust the position of the device based on information from the one or more sensors.

19. The mounting system of claim 17, wherein the axle is of a length sufficient to allow 360° rotation of the first and second arms.

20. The mounting system of claim 17, wherein the device is horizontally offset from the counterweight relative to a longitudinal axis defined by the frame.

* * * * *